INVENTOR
Henry R Strickland

INVENTOR
Henry R Strickland

Patented Feb. 7, 1950

2,496,897

UNITED STATES PATENT OFFICE 2,496,897

BEARING AND SEAL ASSEMBLY FOR TURBINES

Henry R. Strickland, Hartford, Conn., assignor to United Aircraft Corporation, East Hartford, Conn., a corporation of Delaware Application August 23, 1944, Serial No. 550,902

1 Claim. (Cl. 308—36.1)

This invention relates to a bearing and seal assembly for a turbine and is directed particularly to an assembly for use in an elastic fluid turbine.

The use of the Ljungstrom type of labyrinth seal is advantageous where space is limited. These seals must, however, be assembled axially by reason of the interengaging cylindrical flanges. A feature of this invention is a seal assembly by which the elements of the seal may be axially assembled as a unit and held in position when assembled. Another feature is the use of face splines for locking the elements of the seal against relative rotation.

Another feature of the invention is a bearing assembly including a plain bearing and a thrust bearing both forming a unitary sub-assembly.

Another feature is an oil seal forming a part of the seal assembly.

A feature of the invention is the unitary assembly of a labyrinth seal and the bearing structure all of which may be mounted on the shaft as a unit. Another feature is the piloting and mounting of this assembly in the supporting housing.

Other objects and advantages will be apparent from the specification and claim, and from the accompanying drawings which illustrate an embodiment of the invention.

Figure 1:
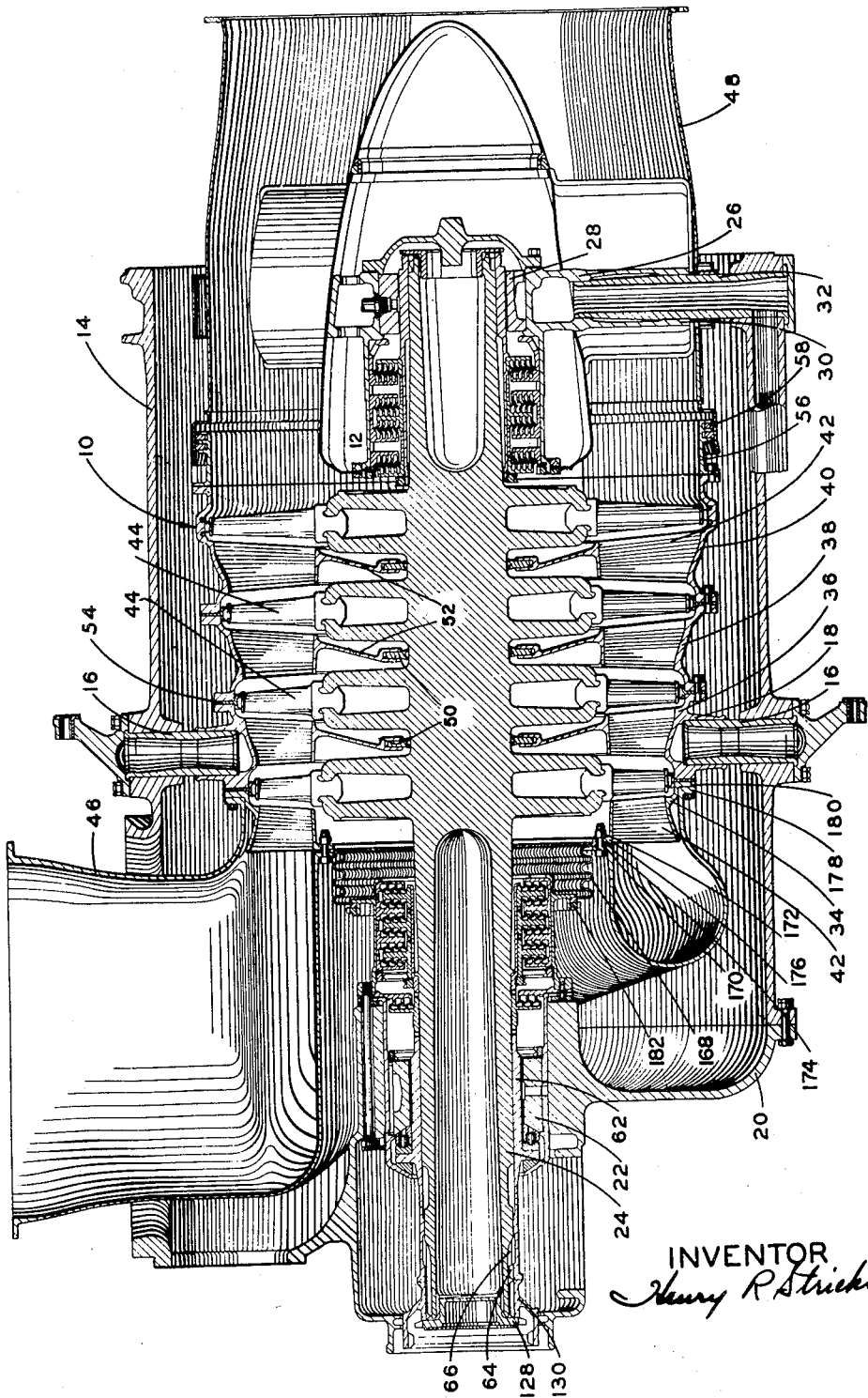
Fig. 1 is a sectional view through the turbine.

The turbine includes a casing 10 and a rotor 12 both supported in a housing 14. The casing is supported by radially extending pins 16 carried by the housing and engaging bores in bosses 18 on the casing. These pins are all in substantially the same plane and constitute the sole support for the casing so that the casing is free to expand lengthwise. In the plane of the pins the casing is smaller than the housing and clearance is provided at the inner ends of pins 16 to permit the casing to expand radially.

Housing 14 has a head 20 which forms a part of the housing and supports a bearing 22 for the front end of the turbine shaft 24 forming an integral part of the rotor. At the other end of the housing a spider 26 supports a bearing 28 for the turbine shaft. The spider has a number of legs 20 engaging radially positioned pins 32 carried by the housing.

Casing 10 is built up of several rings 34, 36, 38 and 40, each of which has a single row of nozzle forming guides 42. These rows of guides alternate with rows of blades 44 on the rotor. Bosses 18 are all on ring 36 so that the supporting pins all engage the same ring. An inlet scroll 46 directs the driving fluid through the row of nozzles on the first casing ring 34 and an exhaust duct 48 guides the driving fluid from the last row of blades on the rotor.

The turbine is made with substantially all of the pieces unsplit or continuous for ease of machining and to assist in reducing the leakage losses to permit assembly of the casing around the solid rotor. Casing rings 36, 38 and 40 are split and are bolted together and to each other in the assembly of the turbine. Diaphragm seals 50 carried by the diaphragms 52 of these casing rings are also split to permit assembly on the rotor. Seals 54 in line with the rows of blades on the rotor are clamped between adjoining casing rings and, as will be apparent, these seals may be unsplit.

Beyond casing ring 40 is a ring 56 which carries rings 58 engaging the leading end of the exhaust duct. The latter is located by the same pins 32 that locate the rear bearing support.

The front bearing and seal are assembled as a unit. As shown in Fig. 2 the bearing 22 engages with a sleeve 62 having splines 64 at its outer end, Fig. 1, engaging with cooperating splines 66 on the turbine shaft. Sleeve 62 forms a bearing surface for the turbine shaft and has a projecting rib 68 one surface of which engages with a bearing ring 70 and the other surface of which engages a number of thrust shoes 72 carried by pins 74 in a ring 76 engaging the end of bearing 22. The opposite surface of rings 70 and 76 may be spherical to accommodate bending of the rotor. Bearing ring 70 engages with an inturned flange 78 on a sleeve 80 which also supports bearing 22 between a projecting rib 82 and a clamping ring 84. With the ring 84 in place the bearing ring 70, the thrust bearing, and bearing 22 are held in assembled relation with sleeve 62. All of these parts may be continuous.

Adjacent to bearing 22 and between this bearing and the power section of the turbine is an oil seal 86 including a sleeve 88 fitting on shaft 24 and having face splines 90 engaging with cooperating splines on the end of sleeve 62. Sleeve 88 carries radially spaced sealing elements 92 cooperating with similar elements 94 on a stationary unsplit disk 96 clamped by screws 98 between a flange 100 on sleeve 80 and a flange 102 on a sleeve 104 that supports the stationary elements of a labyrinth seal 105 which is located between the oil seal and the power section of the turbine.

The labyrinth seal is made of unsplit pieces.

The seal includes an inner sleeve 106 having a shoulder engaging a projecting rib 108 on shaft 24. The end of sleeve 106 may have face splines 109 engaging with cooperating splines on the inner end of sleeve 88. The inner end of sleeve 106 is out of engagement with turbine shaft 24 to prevent direct transmission of heat from the shaft to the seal. Sleeve 106 supports a number of spaced sealing elements 110 having cylindrical openings for receiving sleeve 106 and having interengaging face splines 112 at their adjoining edges. The elements 110 are locked in position between an outwardly extending flange on the inner end of sleeve 106 and a clamping ring 114 which, as shown, engages the sleeve 106 adjacent its outer end. Each of elements 110 has a number of projecting cylindrical flanges 114 cooperating with similar sealing flanges 116 carried by elements 118 fitting within sleeve 104. The elements 118 have outer cylindrical surfaces engaging sleeve 104 and are clamped in position between an inturned flange on sleeve 104 and a clamping ring 120, the latter engaging sleeve 104 adjacent its outer end.

The labyrinth seal may be assembled as a unit. The elements of the oil seal may then be placed in position at the end of the labyrinth seal, and the bearing assembly is then connected to the seal assembly by the screws 98. A spacer ring 122 may be clamped against flange 100 by the screws 98. The front bearing and seal assembly is held in place within a sleeve 124 by studs 126 engaging flanges 102. These studs have clamping nuts 127 accessible at the outer end of sleeve 124. Sleeve 124 is an integral part of head 20.

Figure 2:
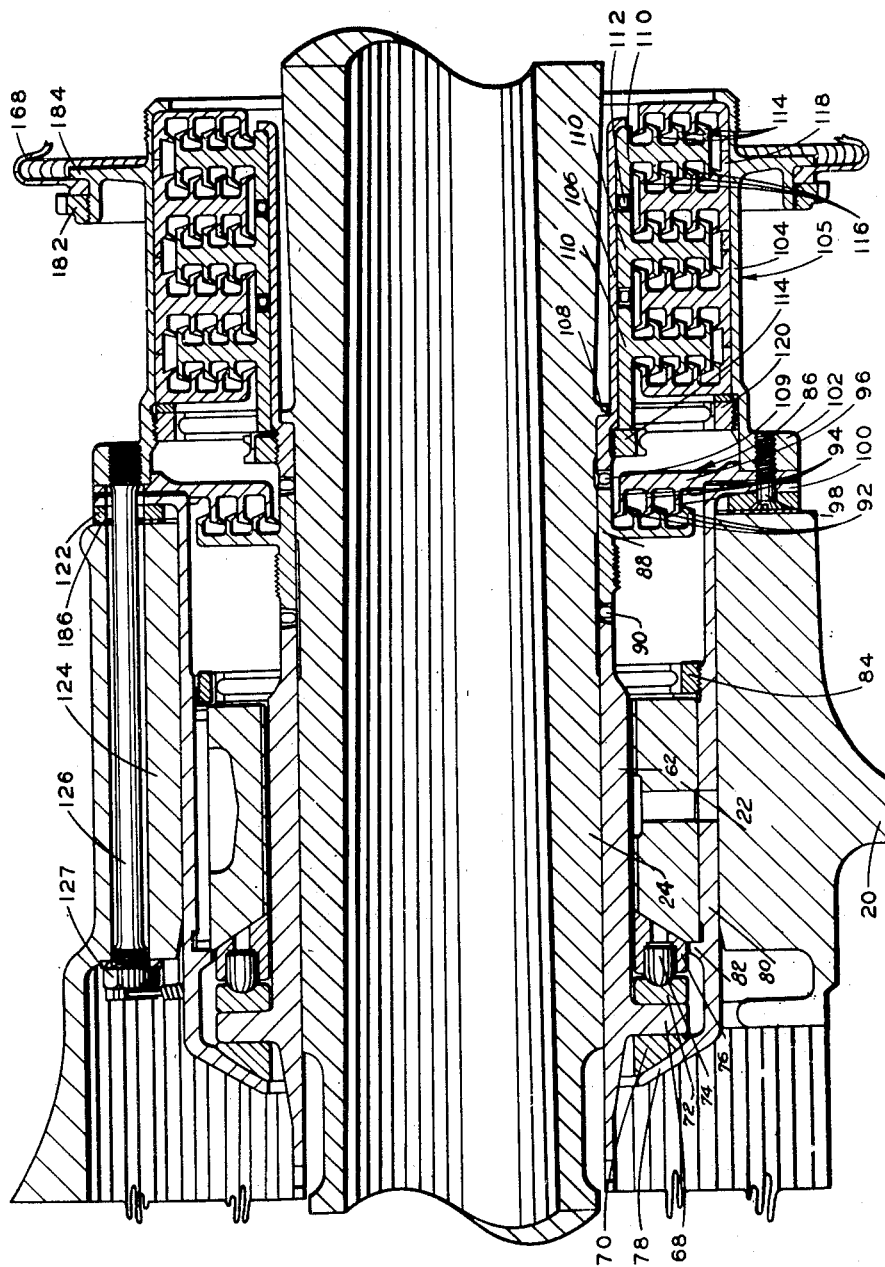
Fig. 2 is a fragmentary sectional view on a larger scale of the front bearing and seal.

Referring to Fig. 1, sleeve 62 may be clamped securely on the turbine shaft by a threaded clamping ring 128 which clamps a splined sleeve 130 against the end of sleeve 62. This sleeve 130 also holds sleeves 88 and 106 in position on the shaft.

The unsplit first stage nozzle ring 34 together with the inlet scroll and a flexible seal 168 are attached to the rest of the casing as a sub-assembly. The nozzle ring has previously been connected to an inner flange 170 on the inlet scroll by bolts 172 which extend through flange 170, a flange 174 on the flexible seal, and a flange 176 extending inwardly from casing ring 34. An outer flange 178 on the inlet scroll and a cooperating flange 180 on the first stage nozzle permit attachment of the scroll and nozzle ring directly to the second stage nozzle ring 36. The outer end of the flexible seal 168 is clamped by a ring 182 against a shoulder 184, Fig. 2, projecting from sleeve 104.

The casing and inlet scroll together with the front and rear bearing and seal assemblies having been mounted on the rotor, and housing 14 mounted in place by the pins 14, the spider 26 being located by the pins 32, cap 20 fastened to housing 14 and the front bearing and seal assembly is located in predetermined relation to the cap by the studs 126. Accurate axial location of the rotor with respect to the casing may be obtained by a washer 186 between spacer ring 122 and the end of sleeve 124.

It is to be understood that the invention is not limited to the specific embodiment herein illustrated and described, but may be used in other ways without departure from its spirit as defined by the following claim.

I claim:

A bearing assembly including a sleeve adapted to be mounted on a rotary shaft and having a projecting flange, a stationary bearing support around the sleeve and having a cylindrical outer surface, a main bearing mounted in the support and engaging said sleeve, a clamping ring within the support and engaging the end of said bearing for holding said bearing in the support, and thrust bearing elements carried by the support and engaging opposite surfaces of said flange, one of said thrust bearing elements being supported axially by the end of said main bearing.

HENRY R. STRICKLAND.

REFERENCES CITED

The following references are of record in the file of this patent:

UNITED STATES PATENTS

| Number | Name | Date |
| --- | --- | --- |
| 1,158,424 | Banner | Nov. 2, 1915 |
| 1,609,496 | Reed | Dec. 7, 1926 |
| 1,712,277 | McIntyre | May 7, 1929 |
| 1,762,117 | Dahlstrand | June 3, 1930 |
| 1,774,655 | Messinger | Sept. 2, 1930 |
| 1,918,988 | Searles et al. | July 18, 1933 |
| 2,040,218 | Soderberg | May 12, 1936 |
| 2,410,340 | Cronstedt | Oct. 29, 1946 |